United States Patent [19]
Jones

[11] 3,994,266
[45] Nov. 30, 1976

[54] ROTARY DIESEL ENGINE
[75] Inventor: Charles Jones, Hillsdale, N.J.
[73] Assignee: Curtiss-Wright Corporation, Wood-Ridge, N.J.
[22] Filed: Sept. 9, 1975
[21] Appl. No.: 611,701

[52] U.S. Cl. .............................. 123/8.11; 418/128; 418/140; 418/141
[51] Int. Cl.$^2$ ........................................ F02B 53/10
[58] Field of Search ...................... 123/8.09, 8.11; 418/141, 125, 127, 129, 140

[56] References Cited
UNITED STATES PATENTS

| | | |
|---|---|---|
| 2,856,120 | 10/1958 | Fawzi .............................. 418/141 |
| 3,644,069 | 2/1972 | Stewart .......................... 418/141 X |
| 3,699,929 | 10/1972 | Bennethum ...................... 123/8.09 |
| 3,777,720 | 12/1973 | Williams ........................ 123/8.09 |

FOREIGN PATENTS OR APPLICATIONS
1,008,529  2/1952  France .......................... 418/141

Primary Examiner—Carlton R. Croyle
Assistant Examiner—Michael Koczo, Jr.
Attorney, Agent, or Firm—Victor D. Behn; Arthur Frederick

[57] ABSTRACT

A rotary diesel engine in which the engine has seal means providing sealing cooperation between each working face of the engine rotor and the engine housing in the region of a lobe junction of the multi-lobe profile of said housing so that during compression, each working chamber is divided by said seal means into leading and trailing portions with the compression of the intake charge of said chamber being substantially confined to its said trailing portion whereby each working chamber compresses its charge to a substantially greater degree than would be the case in the absence of said seal means.

12 Claims, 18 Drawing Figures

ROTARY DIESEL ENGINE

BACKGROUND OF THE INVENTION

The invention relates to rotary engines of the type disclosed in U.S. Pat. No. 2,988,065 granted on June 13, 1961 to Wankel et al. Such rotary combustion engines are available commercially for operation on the Otto cycle with spark ignition with compression ratios of approximately 8:1 to 10:1. In addition, fuel injection versions of such spark-ignited rotary engines have been designed, for example, as shown in U.S. Pat. No. 3,246,636 granted Apr. 19, 1966 to Bentele. For diesel-type operation, higher compression ratios are required, for example, a compression rate of approximately 15:1 or higher. U.S. Pat. No 3,331,358 granted July 18, 1967 to Muller et al is an example of a diesel rotary engine of this type.

As disclosed in said Wankel et al patent, the engine has a multi-lobe cavity which preferably has an epitrochoidal profile. The shape of the epitrochoidal engine cavity determines the compression ratio. Thus, an epitrochoid having a smaller ratio of $a/b$ has a larger compression ratio, where $a$ is equal to one-half the length of the major axis of the epitrochoid and $b$ is equal to one-half the length of its minor axis. Today it is more common to express the shape of the epitrochoid in terms of a so-called "K" factor which is equal to the ratio $R/e$ where R is the radial distance from the center of the rotor to the tip of its apex seals and $e$ is the distance between the rotor center and the engine axis. In general, the magnitude of the K factor increases as the ratio $a/b$ decreases. Hence, for higher compression, a rotary engine of the type shown in said Wankel et al patent should have a high K factor.

As is evident from the disclosure of said Wankel et al patent, at high compression ratios the shape of each engine working chamber at its top dead center position becomes extremely thin in a radial direction and therefore combustion in the working chambers is subject to severe cooling or chilling by the radial walls of the chamber. For this reason, it is difficult to make a successful diesel-type rotary combustion engine of the type disclosed in the Wankel et al patent simply by changing the engine K factor to increase the engine compression ratio.

Diesel-type rotary combustion engines have been designed, for example, by using a supercharger as in U.S. Pat. No. 3,858,557 granted on Jan. 7, 1975 to Myers et al. Such diesel-type engines, however, require the added complexity of a supercharger. Diesel-type rotary combustion engines have also been designed using a general square rotor mounted within a three-lobed epitrochoid with the porting designed to provide for double compression strokes. This latter type of rotary diesel is shown in U.S. Pat. No. 3,097,632 granted on July 16, 1963 to Froede et al. This latter configuration results in a substantially larger and heavier engine for a given power output than is obtainable with an engine configuration employing a generally triangular rotor mounted within a two-lobed epitrochoid.

SUMMARY OF THE INVENTION

An object of the invention resides in the provision of a novel and relatively simple diesel rotary engine avoiding the aforementioned problems encountered with prior diesel rotary engines.

In accordance with the invention, the rotary engine of the present invention has the normal configuration of a generally triangular rotor mounted within a three-lobed epitrochoid. Also, the K factor of the engine epitrochoid is made such that the compression ratio of the engine in the absence of the invention would be substantially below that required for diesel operation; for example, this compression ratio would be about 8.5:1 to 10:1. In order to achieve a higher compression ratio sufficient for diesel operation, seal means are provided so that during its compression phase each working chamber of the engine is divided into leading and trailing portions with compression of its intake charge being substantially confined to its trailing portion. Compression thereafter continues in the trailing portion of the chamber whereupon the minimum volume of this trailing portion at the top dead center position of the working chamber is substantially less than what it would be in the absence of said seal means. In this way, compression ratios sufficient for diesel operation are attainable in the trailing portion of each working chamber and therefore upon fuel injection into this trailing portion, the fuel self-ignites to provide diesel type combustion.

Therefore, it is a further object of the invention to provide a rotary combustion engine having a multi-lobe engine cavity in which the rotor housing has sealing cooperation with the rotor in the region of maximum compression in each engine working chamber, said cooperation being effective to divide each working chamber into leading and trailing portions during the compression phase in order to increase the effective compression ratio in the trailing portion such that upon introduction of fuel into said trailing portion of each working chamber, preferably slightly before the top dead center position of the chamber, the fuel self-ignites.

In one embodiment of the invention, said sealing cooperation is provided by a seal element which is carried by the rotor housing at a junction of the trochoid lobes. U.S. Pat. No. 3,391,677 granted July 9, 1968 to Hejj discloses a Wankel-type rotary engine having a seal element carried by the rotor housing in a similar position but for a different purpose. As disclosed herein, this rotor housing seal element is periodically retracted or lifted out of contact with the rotor by a force derived from the pressure in the trailing portion of each working chamber. In another form of the invention, mechanical means operable in timed relation to the engine shaft are utilized to control the motion of this housing seal element.

In still another form of this invention, in lieu of a movable housing seal element, the facing surfaces of the housing and rotor may be shaped to provide a labyrinth-type seal to divide each working chamber into leading and trailing portions during the compression phase.

Other objects of the invention will become apparent upon reading the following detailed description in connection with the drawings.

Description of Preferred Embodiments

Figure 1:
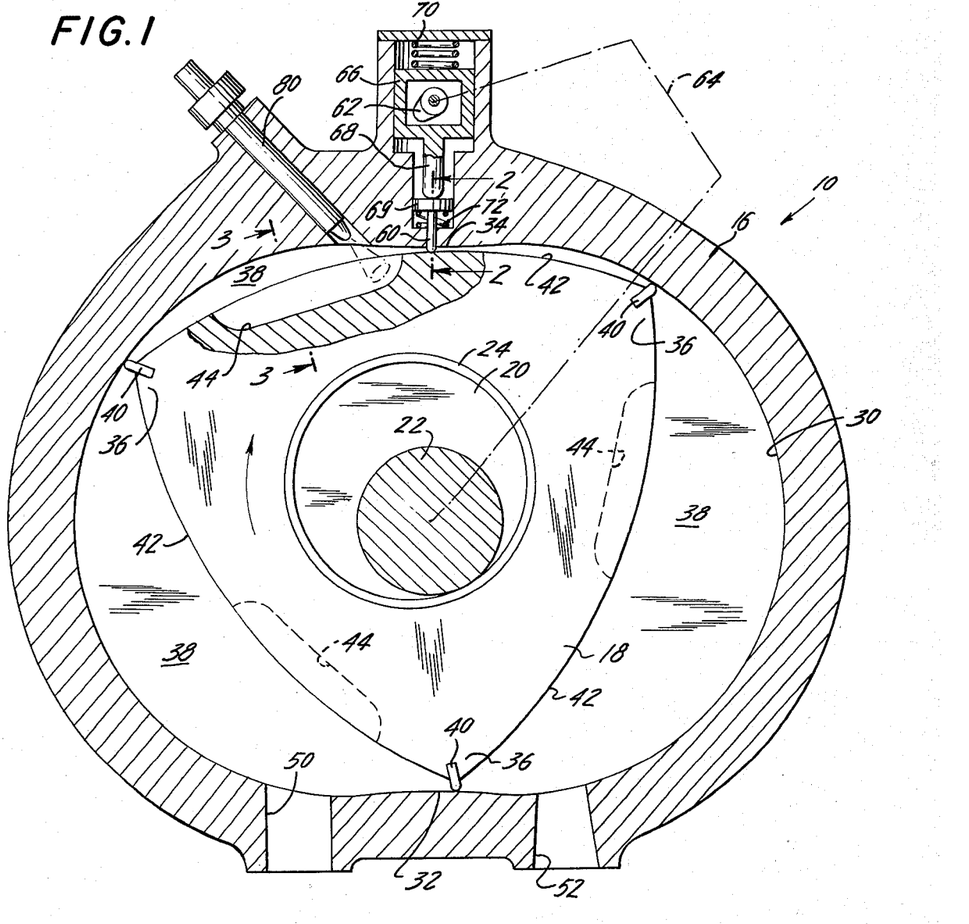
FIG. 1 is a transverse sectional view through a rotary engine embodying the invention.
Figure 2:
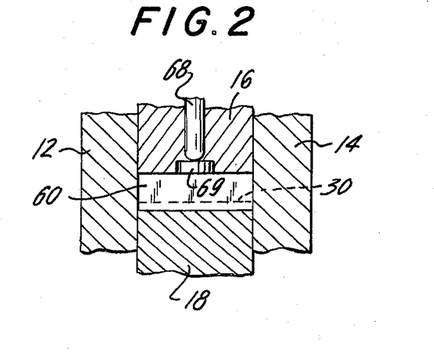
FIGS. 2 and 3 are partial sectional views taken along line 2—2 and 3—3, respectively, of FIG. 1.

Referring first to FIG. 1 of the drawing, a rotary combustion engine is schematically indicated at 10, the configuration of the engine being generally similar to that shown in aforementioned U.S. Pat. No. 3,246,626. Thus, the engine 10 comprises an outer body or housing consisting of two axially spaced end housings 12 and 14 and an intermediate or rotor housing 16, said housings being secured together to form an engine cavity therebetween. An inner body or rotor 18 is journaled for rotation within the housing cavity on an eccentric portion 20 of a shaft 22 which extends coaxially through and is supported by the end housings 12 and 14. A sleeve bearing 24 preferably is provided between the rotor 18 and shaft eccentric 20.

The peripheral inner surface 30 of the intermediate housing 16 is illustrated as having a two-lobe profile which preferably is basically an epitrochoid, said two lobes joining at junctions 32 and 34. Thus, the lobe junctions 32 and 34 are on the minor axis of the trochoid surface 30. The rotor 18 has a generally triangular profile with apex portions 36 having sealing cooperation with the trochoidal surface 30 to form three engine working chambers 38 between the engine rotor 18 and engine housing. For this purpose, each of the rotor apex portions 36 is provided with a seal strip means 40, each of which extends across the rotor between the housing end walls 12 and 14. In addition, suitable means (not shown) are provided between the rotor 18 and side housings 12 and 14 to complete a seal grid around each working chamber 38.

Figure 3:
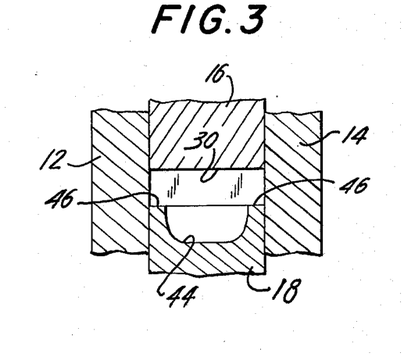

Each of the three peripheral or working faces 42 of the rotor extend circumferentially from one apex seal 40 to an adjacent apex seal and is provided with a trough-like pocket or recess 44 for transferring gas in the working chambers 38 across the lobe junctions 32 and 34. Each trough-like recess 44 has a width less than that of the rotor 18 to leave lands 46 (see FIG. 3) between each recess 44 and the adjacent axial end edges of the rotor and preferably is circumferentially elongated.

An air intake passage 50 opens through the rotor housing adjacent to and on one side of the lobe junction 32 for supplying air to the engine working chambers 38. An exhaust passage 52 opens through the rotor housing adjacent to and on the other side of the lobe junction 32. Engine combustion is initiated in the working chambers adjacent to the other lobe junction 34.

The engine 10 also includes conventional gearing (not shown) between the rotor 18 and the engine housing to control relative rotation of the rotor.

The engine structure so far described is conventional and is generally similar to that disclosed in aforementioned U.S. Pats. Nos. 2,988,065 and 3,246,636. Reference is made to said prior patents for further details of such an engine including details of the rotor seals and the gearing between the rotor and housing.

With such an engine, during engine operation and with the rotor rotating clockwise as viewed in FIG. 1, the volume of each working chamber 38 periodically increases from a minimum volume condition, when it is located adjacent to the lobe junction 32 and opens to the intake passage 50, to a maximum volume condition and closes to the intake passage and then said working chamber decreases in volume to compress its intake charge until the working chamber reaches a minimum volume condition adjacent to the lobe junction 34. Thereafter, the volume of the working chamber again increases to a maximum and then decreases to a minimum as the chamber comes into communication with the exhaust passage adjacent the lobe junction 32 to complete the cycle.

In accordance with one embodiment of the present invention, a radially movable seal strip 60 is mounted in the rotor housing 16 adjacent to the lobe junction 34. The seal strip extends completely across the rotor housing from the end housing 12 to the other end housing 14 and, as shown in FIG. 1, is arranged to contact the working faces 42 of the rotor.

In the embodiment of FIG. 1 the seal strip 60 is arranged to be moved periodically into and out of contact with the rotor working faces 42 by a cam arrangement. This cam arrangement consists of a cam 62 arranged to be driven at the same rotative speed as the engine shaft 22 by means schematically indicated at 64. The cam 62 is surrounded by a cam follower 66 having an extension 68 engageable with a head portion 69 on the seal strip 60. A relatively strong spring 70 urges the cam follower 66 in a downward direction, as viewed in FIG. 1, for extending the seal strip 60 against the rotor surfaces 42 and a relatively weak spring 72 is shown under the seal head 68 for retracting the seal strip when permitted by the cam follower.

Each trough-like recess 44 in the working faces 42 of the rotor is disposed so as to be closer to the trailing end of its face 42 as viewed in the direction of rotor rotation. Preferably, as illustrated, each recess 44 is substantially confined to the trailing half of its working face 42. Fuel for combustion in each working chamber 38 is supplied by a fuel nozzle 80 disposed adjacent to the lobe junction 34 on the side of said junction opposite to the direction of rotation of the rotor 18, that is, the fuel nozzle 80 is disposed adjacent to the lobe junction 34 but on the side of said junction nearest to the intake port 50. Preferably, as illustrated in FIG. 7, the fuel nozzle 80 is located to discharge its initial fuel into the leading portion of each rotor recess 44.

The operation of the engine 10 can best be understood by reference to FIGS. 4–10. To facilitate the description, the three working chambers 38, the three apex seals 40, the three working faces 42 of the rotor and the three rotor recesses 44 are separately identified in FIGS. 4–10 by the addition of the letters a, b or c to their respective reference numbers.

Figure 4:
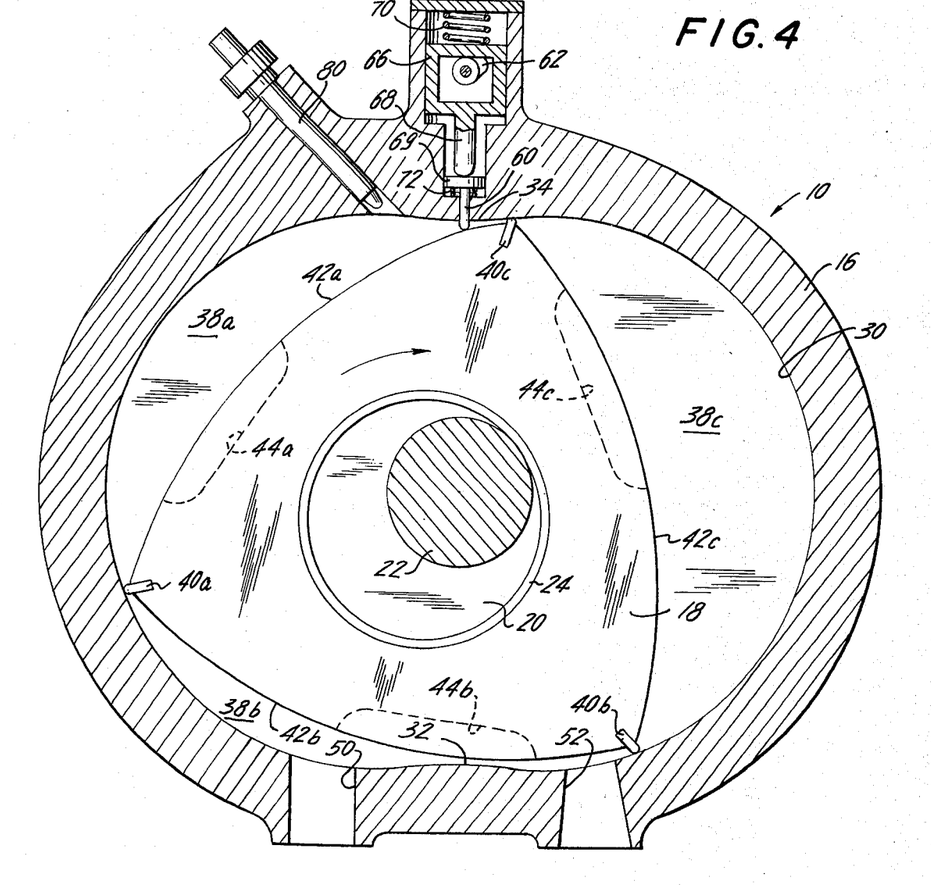
FIG. 4 is a view generally similar to FIG. 1 but showing the engine rotor in a different position.

In FIG. 4, the apex seal 40c has just passed by the housing seal 60. The cam 62 is timed so that it permits the spring 70 to immediately lower the cam follower 66 so as to extend the housing seal 60 against the working face 42a of the rotor. At this time the working chamber 38a is out of communication with the intake passage 50 and is undergoing compression. However, only the trailing portion of the working chamber 38a is compressed once, as in FIG. 4 the housing seal 60 comes into contact with the rotor working face.

Figure 5:
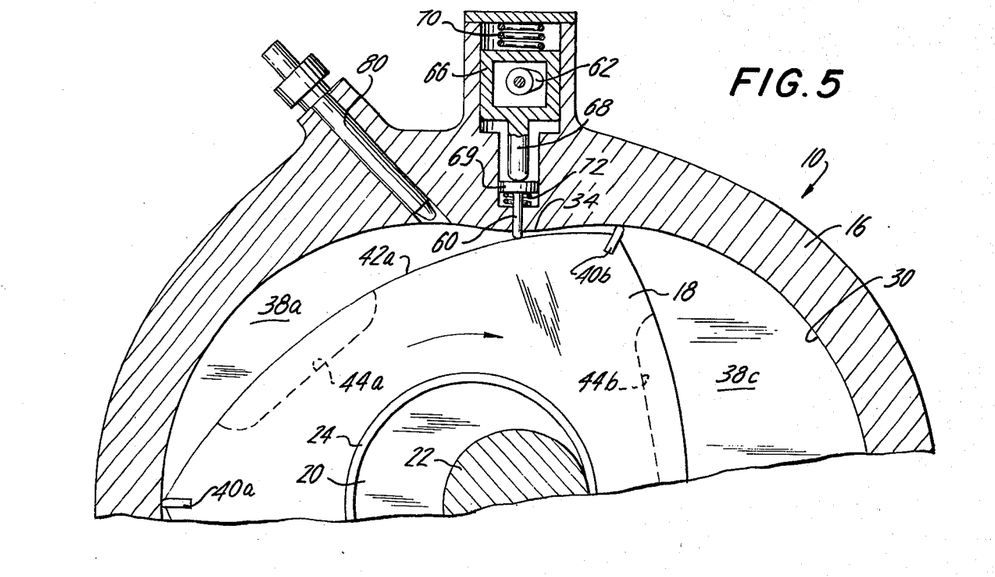
FIGS. 5—10 inclusive, are partial sectional views generally similar to the upper portion of FIG. 1 but showing the engine rotor in various positions.
Figure 6:
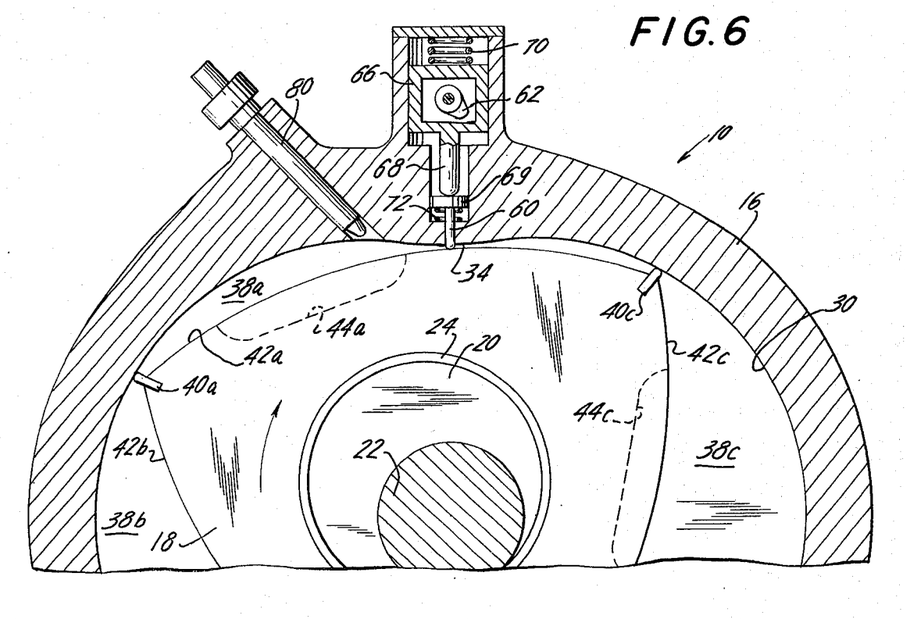
Figure 7:
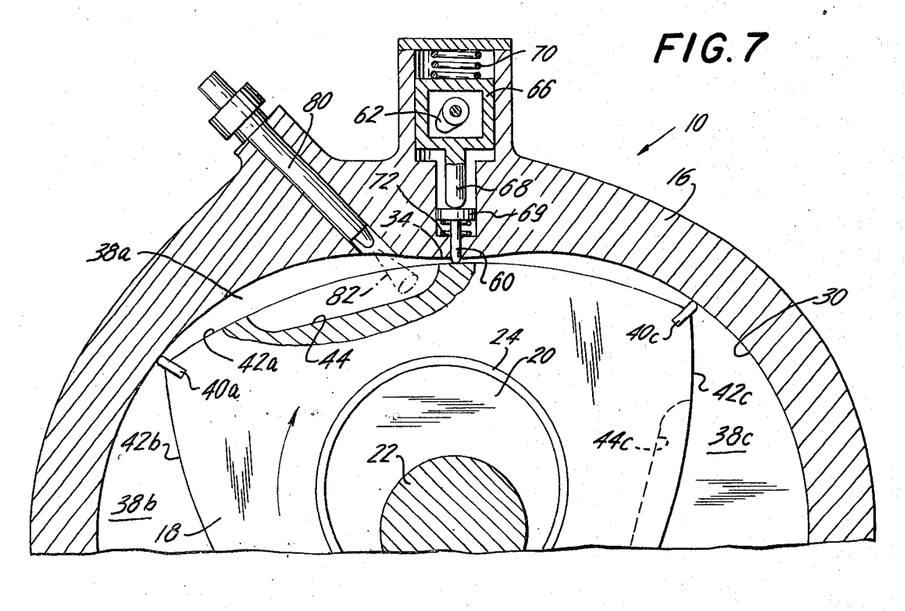

FIGS. 5, 6 and 7 show successive positions of the rotor as it advances from its position of FIG. 4 and also shows the corresponding successive positions of the cam 62, which in these positions does not engage the cam follower 66. Thus, the air charge taken into the working chamber 38a is compressed into the trailing portion of said chamber, that is, the portion between the housing seal 60 and the apex seal 40a. Accordingly, the volume of the intake charge decreases to a greater extent during compression than it would in the absence of the housing seal 60. Thus, if the volume compression ratio of the engine intake charge were 8.5 or 10:1 in the absence of the housing seal 60, this compression ratio becomes substantially higher by the addition of the housing seal 60 and can be made sufficiently high, for example, 15:1, for diesel operation when the rotor reaches its position of FIG. 7.

Figure 8:
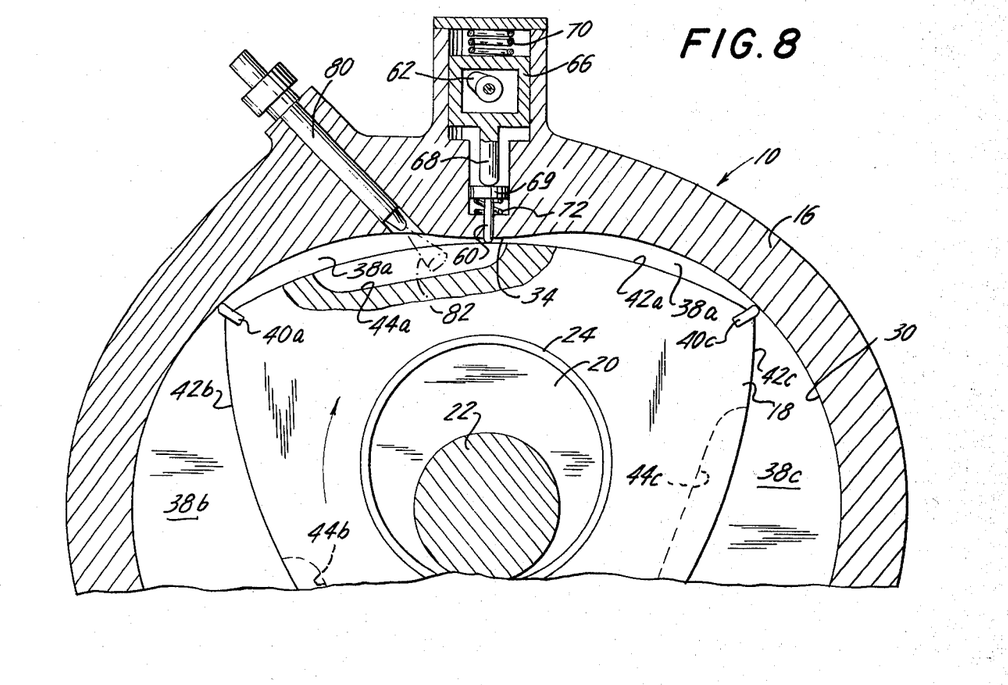

When the rotor reaches its position of FIG. 7, fuel is discharged through the nozzle 80 into the working chamber 38a upstream of the housing seal 60. The rotor recess 44a preferably is located so that the initial portion of the fuel spray is directed into the leading portion of the recess 44a. Because of the effective high compression ratio in the trailing portion of the working chamber (that is the working chamber portion upstream relative to rotor rotation, of the housing seal 60), the fuel self-ignites to provide a diesel-type combustion. FIG. 8 illustrates the rotor slightly advanced from its position of FIG. 7 with fuel injection continuing from the nozzle 80. At this point the housing seal rides on the two lands 46 (see FIG. 3) on each side of the rotor recess 44a. Also with the rotor in the position of FIG. 8, combustion gases can now flow under the housing seal 60 from the leading portion of the recess 44a to the leading portion of the working chamber 38a, that is, to the portion of the working chamber 38a which is downstream (relative to the direction of rotor rotation) of the housing seal 60.

Figure 9:
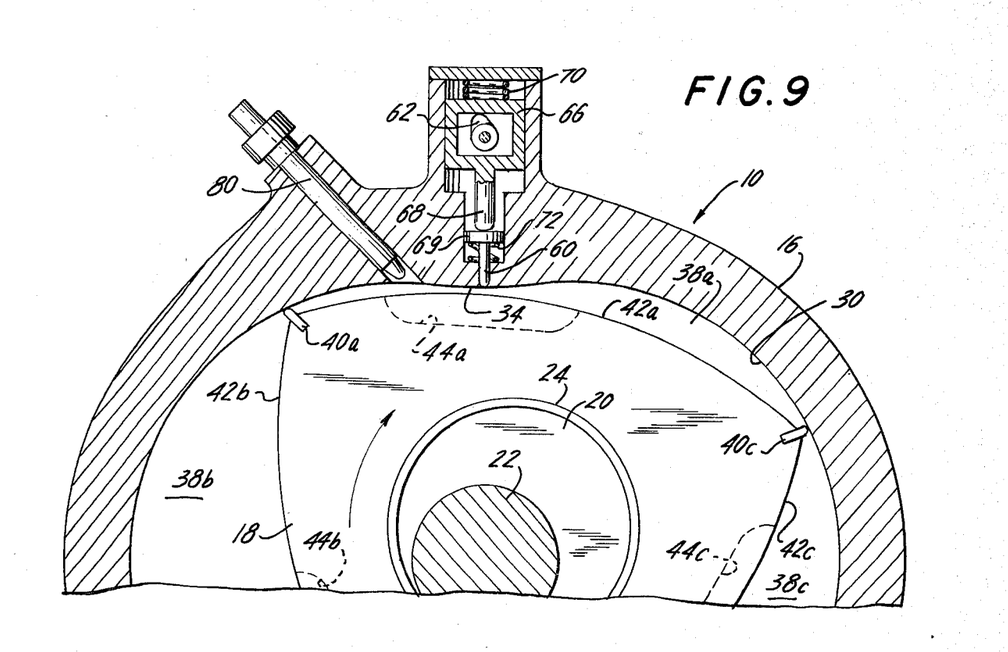
Figure 10:
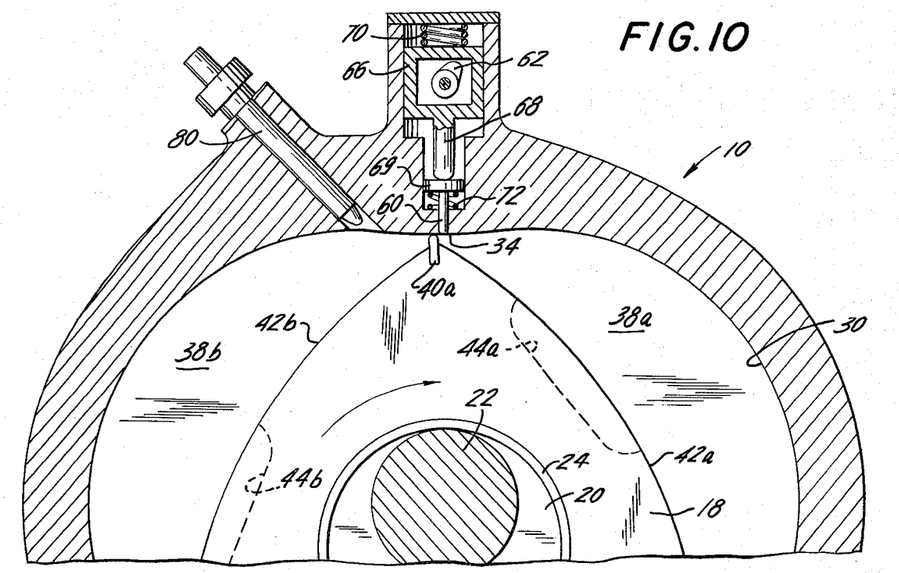

Upon slight further rotation of the rotor to its position of FIG. 9, the cam 62 is now effective to raise the cam follower 66 so that the light spring 72 is able to retract the housing seal 60 to such an extent that the housing seal 60 no longer protrudes beyond the trochoid surface 30. As shown in FIGS. 9 and 10, with the housing seal 60 so retracted the leading and trailing portions of the working chamber 38a are now in full communication and, as is shown in FIG. 10, this housing seal retraction permits the rotor apex seal 42a to rotate past the housing seal 60 without interference from the housing seal.

As is apparent from FIG. 10, upon slight further engine rotation beyond its position of FIG. 10, the cam 62 will rotate to permit the spring 70 to again extend the housing seal 60 against the rotor as in FIG. 4 but now against the rotor working face 42b whereupon the above described combustion process will be repeated, but now in the working chamber 38b.

Except for the diesel-type combustion process described, the remainder of the cycle of each working chamber 38 is the same as in a conventional non-diesel rotary engine such as described in aforementioned U.S. Pats. Nos. 2,988,065 and 3,246,636. More particularly, the remainder of the cycle is similar to that in a rotary engine having an auxiliary or pre-combustion chamber in the rotor housing such as disclosed in U.S. Pat. No. 3,387,595 granted June 11, 1968 to Bentele. The power output of the diesel engine 10 is regulated by varying the quantity of fuel supplied through the nozzle 80 to each working chamber as in a conventional diesel engine. Also as is usual in diesel engines, a suitable glow plug or other igniter (not shown) preferably is located adjacent to the nozzle 80 to facilitate starting of the engine.

Figure 11:
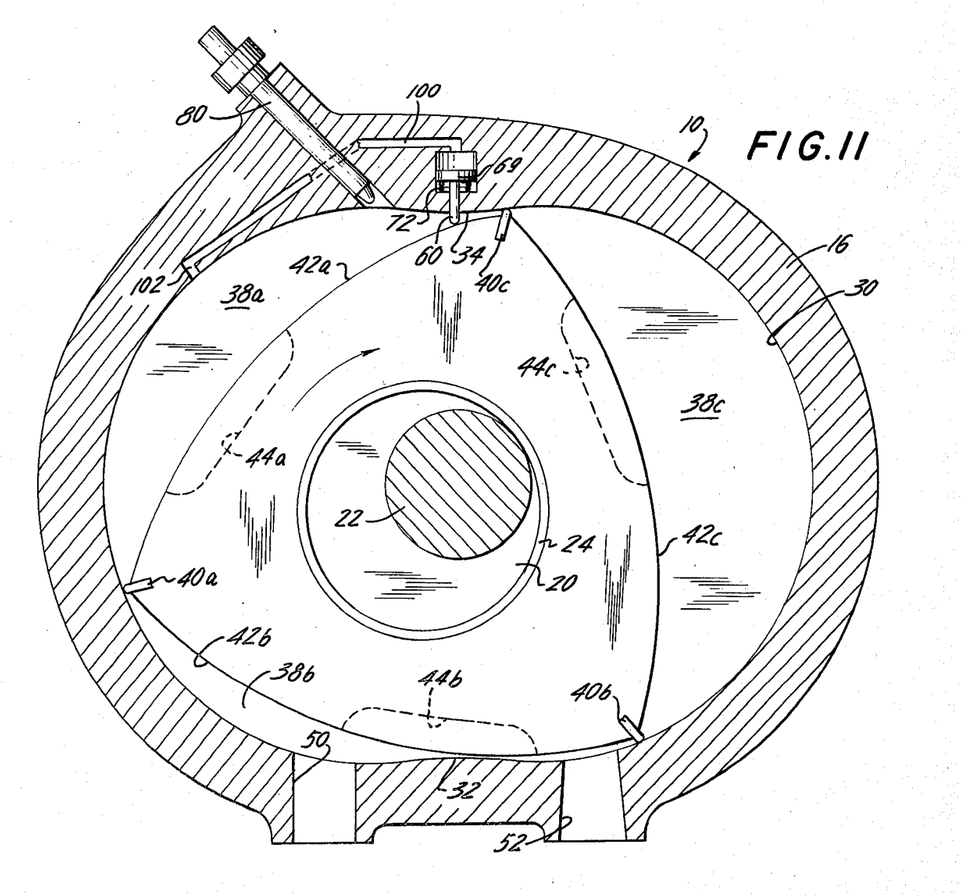
FIG. 11 is a view generally similar to FIG. 4 but showing another embodiment of the invention.
Figure 12:
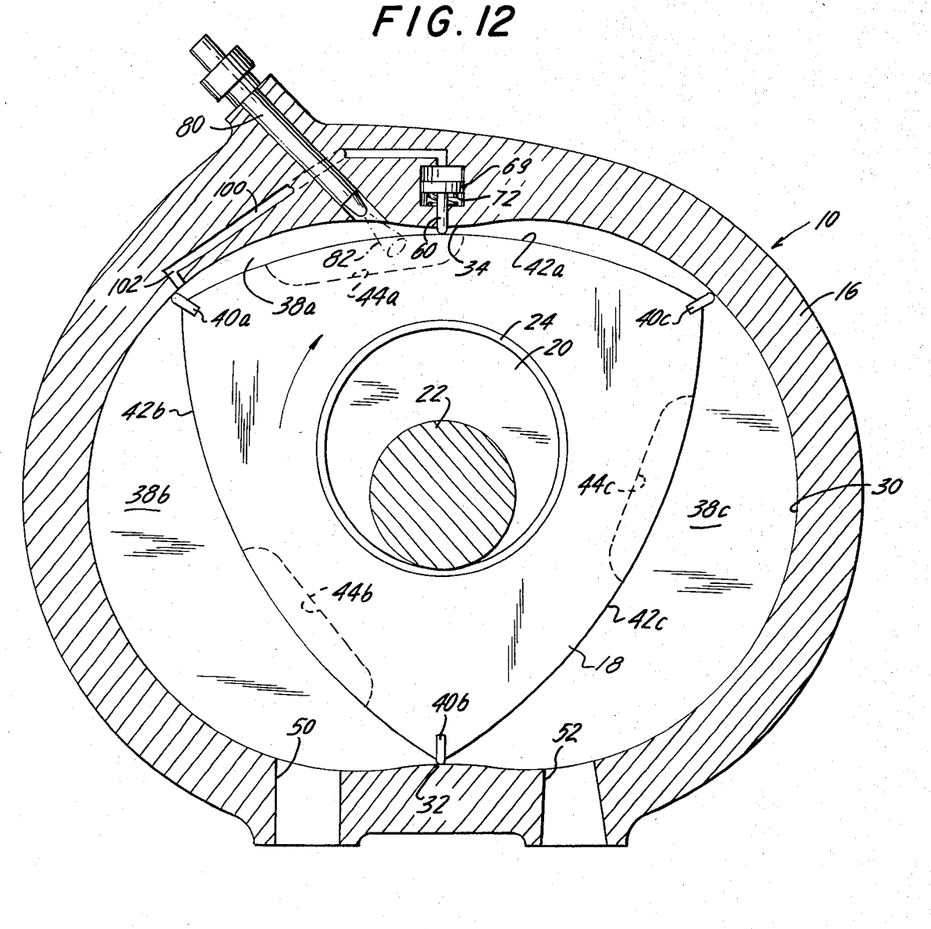
FIGS. 12 and 13 are views similar to FIG. 11 but showing the engine rotor in different positions.
Figure 13:
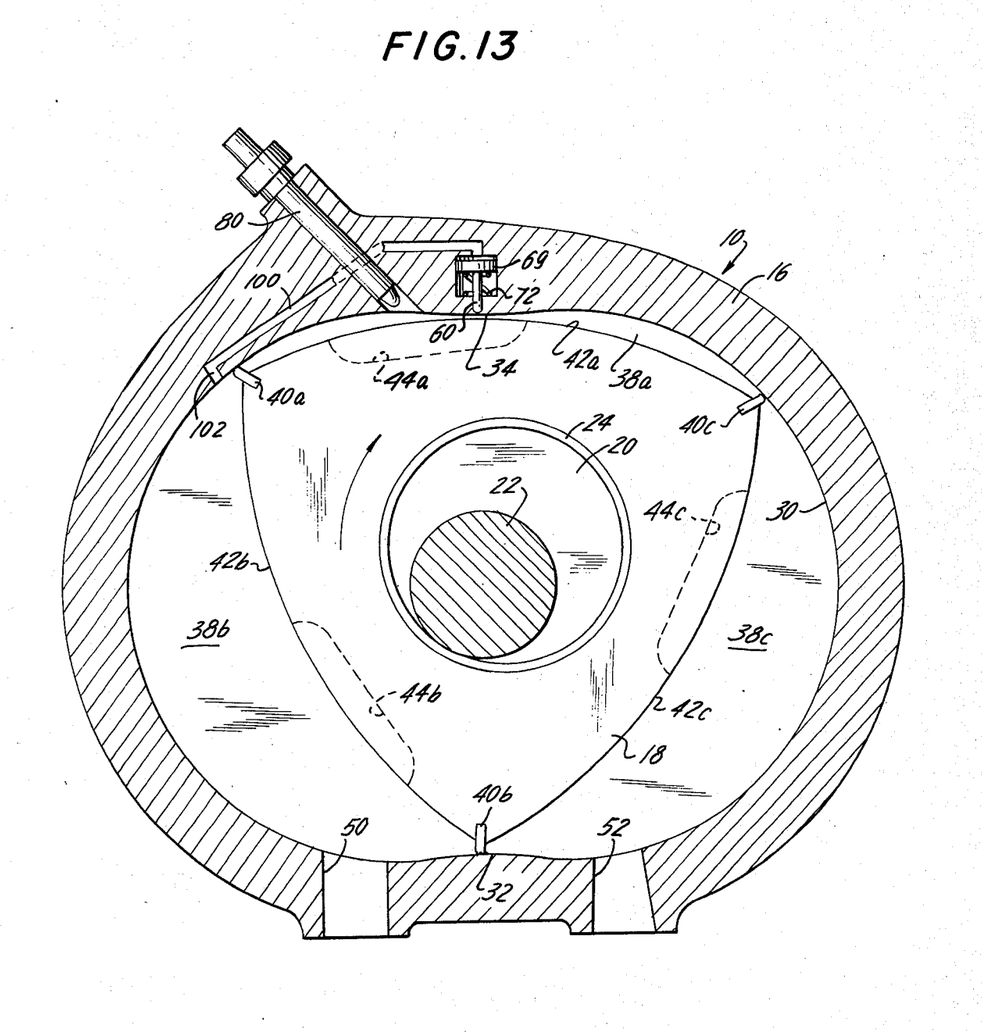
Figure 14:
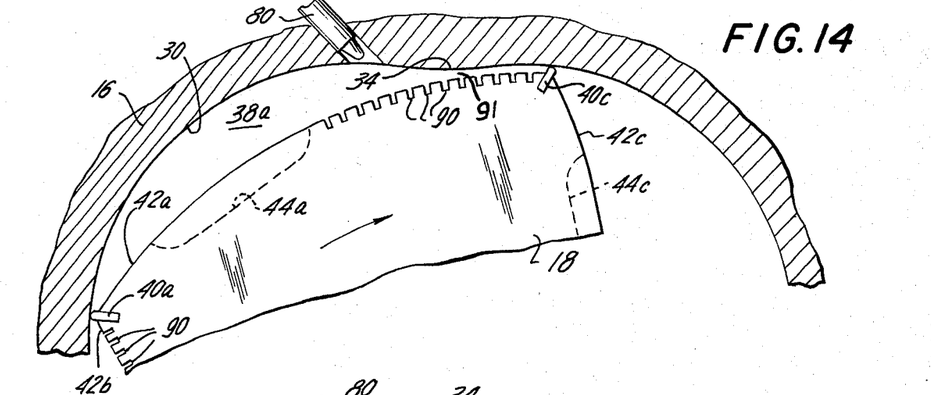
FIGS. 14–17 inclusive, are partial views with the rotor in the positions of FIGS. 5–8 respectively, but showing a further modification of the invention.
Figure 15:
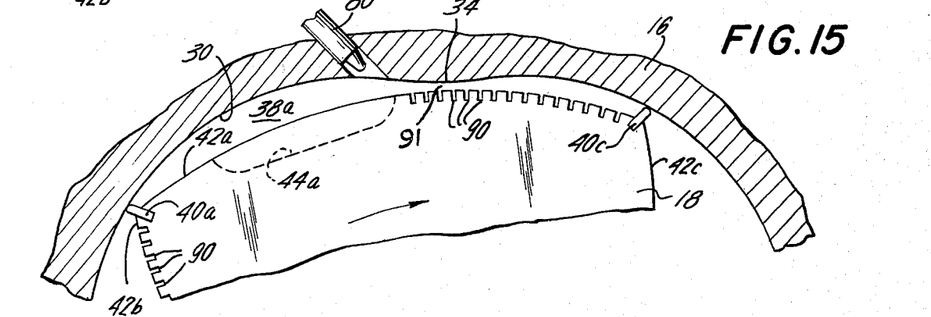
Figure 16:
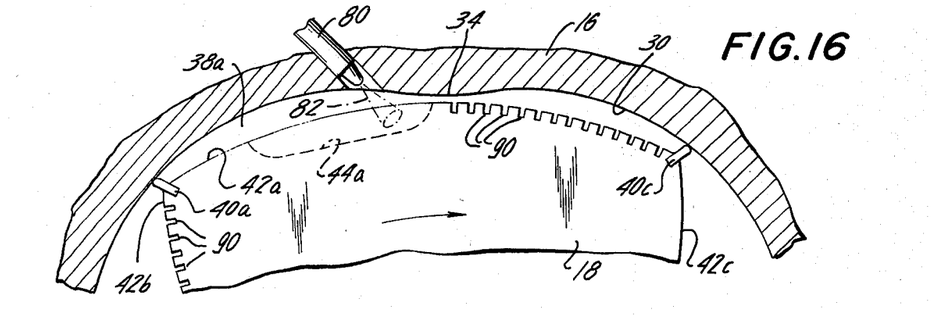
Figure 17:
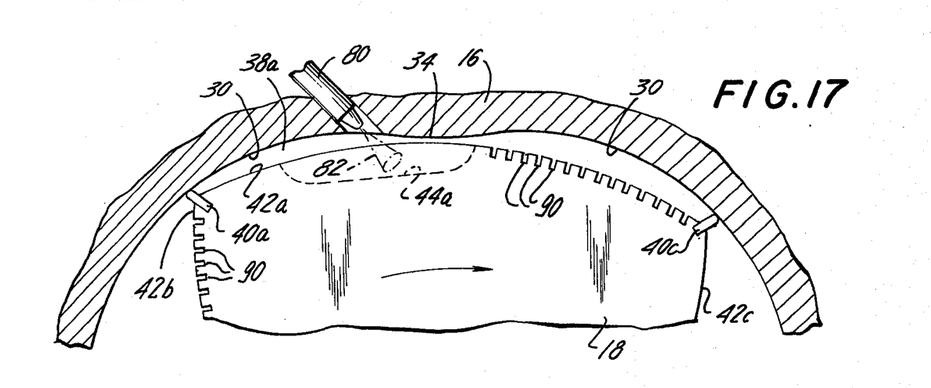

FIGS. 11–13 illustrate another embodiment of the invention in which gas pressure is used for moving the housing seal in lieu of the mechanically driven cam 62. The parts of FIGS. 11–13 corresponding to the parts of the embodiment of FIGS. 4–10 have been designated by the same reference numerals and, therefore, no further description of these parts appears necessary.

In FIG. 11 the rotor 18 is shown in the same position as in FIG. 4 but now the housing seal 60 is extended to engage the rotor face 42a by gas pressure derived from the working chamber 38a which is then undergoing compression. For this purpose a passage 100 leads from the working chamber 38a to the upper side of a head portion 69 of the housing seal 60. The size of the head portion 69 is selected so that this pressure is effective to extend the housing seal shortly after an apex seal (40c in FIG. 11) has passed under the housing seal 60. Also for this purpose the underside of the seal head portion 69 is vented by a passage (not shown) for example, to the atmosphere.

The housing seal 60 continues to be pressurized against the rotor by pressure supplied by the passage 100 until the rotor reaches its position of FIG. 12. At this point, the apex seal 42a is about to pass across the upstream end 102 of the passage 100. Thus, upon slight further rotation of the rotor 18 to the position of FIG. 13, the apex seal 40a passes beyond the end 102 of the passage 100. Now the passage 100 is placed in communication with the working chamber 38b which at this point is in its intake phase. Accordingly, the passage 100 is no longer effective to provide gas pressure to the upper side of the seal head 69 whereupon the spring 72 is immediately effective to retract the housing seal 60. Thus, the upstream end 102 of the passage 100 is located so that the housing seal 60 is retracted approximately when it is disposed adjacent to the leading edge of a rotor recess 44. Also the size of the seal head portion 69 and force of the spring 72 are selected so that the gas pressure from the passage 100 is not effective to extend the housing seal 60 until after an apex seal has passed under the housing seal as in FIG. 11.

It is apparent therefore that the operation of the embodiment of FIGS. 11–13 is essentially the same as that of FIGS. 1–10. In both cases a housing seal 60 is provided so that sufficient pressure and temperature of the intake charge is generated in the trailing portion of each working chamber 38 (that is the working chamber portion upstream, relative to the direction of rotor rotation, of the housing seal 60) so that when fuel is injected into this compressed charge, diesel-type combustion is initiated in each working chamber. After combustion has been initiated in a working chamber 38 the housing seal 60 is retracted whereupon the remainder of the cycle in each working chamber is the same as in a conventional non-diesel rotary engine.

In lieu of the mechanical seal 60 shown in the embodiments of FIGS. 1–10 and FIGS. 11–13, a labyrinth type sealing arrangement could be used for the same purpose. Such a modification is shown in FIGS. 14–17. The parts of FIGS. 14–17 corresponding to those of FIGS. 1–10 are designated by the same reference numerals so that no detailed description of these parts is required in connection with FIGS. 14-17.

In FIGS. 14-17, the rotor 18 is shown in the same positions as in FIGS. 5-8 respectively. In FIGS. 14-17, in lieu of the mechanical seal 60, each of the rotor working faces 42 is provided with labyrinth-type recesses, for example grooves 90, on the portion of said rotor working face extending between its recess 44 and the apex seal 40 at the leading end of said rotor working face. Thus, in FIGS. 14-17, the rotor working face 42a is provided with labyrinth-type grooves 90 on the portion of said working face between the rotor recess 44a and the apex seal 40c.

The grooves 90 preferably extend axially across the rotor working faces 42 from one axial end face of the rotor to the other. However, a series of shorter grooves or even a series of holes may be provided in lieu of each single groove 90.

With the labyrinth construction of FIGS. 14-17, the outer periphery of the rotor 18 preferably is made as large as possible so that the radial clearance 91 between the rotor and the trochoid lobe junctions 32 and 34 is made as small as possible and still avoid any mechanical interference between the rotor 18 and rotor housing 16 during engine operation notwithstanding such factors as bearing clearances and manufacturing tolerances. In this way the effectiveness of the labyrinth seal 90 is maximized. The magnitude of the clearance 91 has been exaggerated in the drawing for clarity of illustration.

By comparing FIGS. 14-17 with FIGS. 5-8, it is clear that the labyrinth seal provided by the grooves 90 serve essentially the same function as the mechanical seal 60. Thus the labyrinth grooves 90 on each rotor working face 42 provides a seal between the leading portion of each working face 42 of the rotor and the rotor housing at the lobe junction 34 to divide the adjacent working chamber into leading and trailing portions until the leading edge of the recess 44 of said rotor working face moves past said lobe junction 34 as in FIG. 17, at which point the labyrinth seal 90 for said working face becomes ineffective.

Figure 18:
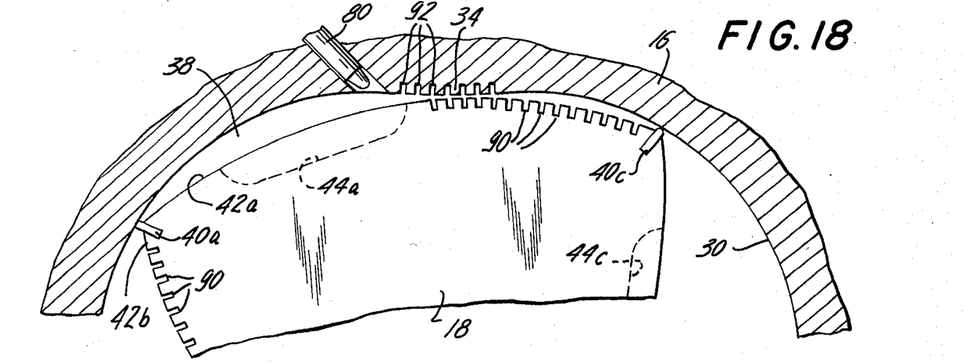
FIG. 18 is a partial view similar to FIG. 15 but showing a still further modification of the invention.

In lieu of, or in addition to, providing the labyrinth seal grooves or recesses on each rotor working face 42, such seal grooves may be provided on the trochoidal surface 30 of the rotor housing around the lobe junction 34, as illustrated in FIG. 18. Thus, as shown in FIG. 18, labyrinth grooves 92 are provided on the trochoid surface 30 in the region of the lobe junction 34 in addition to the labyrinth grooves 90 on each rotor working face 42. In order not to interfere with passage of the rotor apex seals 40 across the labyrinth grooves 92 on the rotor housing, the grooves 92 preferably are inclined to the engine axis. Also, so as not to interfere with the apex seals the grooves 92 could be replaced with a series of holes. The operation of FIG. 18 obviously is essentially the same as that of FIGS. 14-17.

From the foregoing description it is apparent that in each of the embodiments described, FIGS. 1-10, FIGS. 11-13, FIGS. 14-17 and FIG. 18, diesel operation can be achieved in a rotary engine having a K factor such that in the absence of the housing seal 60, the labyrinth seal 90 or 92, the engine compression ratio would be much too low (8.5 or 10:1) for diesel operation. Applicant thereby has provided a rotary diesel engine without the disadvantage of going to a high K factor to obtain diesel-type compression ratios. As already noted, rotary engines having a K factor sufficiently high for diesel operation result in the engine working chambers being extremely narrow in a radial direction at the time of combustion thereby resulting in poor or incomplete combustion. In addition, applicant's invention avoids the aforementioned disadvantages involved in using a supercharger or in using a rotary engine with a square rotor to provide two-stage compression in order to achieve diesel operation.

It should be understood that this invention is not limited to the specific embodiments or details of construction described but that modifications may be made therein without departing from the spirit or scope of the invention. I aim in the appended Claims to cover all such modifications.

I claim:
1. A rotary combustion diesel engine comprising:
   a. an outer body having an internal cavity, the peripheral surface of which has a multi-lobe profile, said outer body also having an air intake passage and a combustion gas exhaust passage;
   b. an inner body of generally polygonal profile mounted for relative rotation within said outer body with the working faces of the rotor extending between adjacent apex portions of the inner body, the apex portions of said inner body having sealing cooperation with said multi-lobe surface of the outer body to define a plurality of working chambers between said inner and outer bodies which vary in volume in response to said relative rotation;
   c. means providing sealing cooperation between a leading portion of each working face of the inner body and a portion of the outer body adjacent to a lobe junction of the multi-lobe peripheral surface of the outer body in the region in which combustion takes place, said sealing cooperation starting shortly after the apex portion at the leading end of said working face has moved past said lobe junction and continuing at least until the adjacent working chamber has reached a position shortly before its top dead center position so as to effectively divide the adjacent working chamber into leading and trailing portions and so that as the inner body rotates during said sealing cooperation, the effective volume of said trailing portion of the working chamber decreases to compress the intake charge therein sufficiently for diesel-type operation;
   d. means for injecting fuel into said trailing portion of each working chamber when said chamber has reached a position shortly before its top dead center position and said sealing cooperation is still effective so that the conditions in its said trailing portion are such that the fuel self-ignites; and
   e. means for causing said seal means to become ineffective after combustion has been initiated in the trailing portion of a working chamber so as to establish communication between the leading and trailing portions of said working chamber.

2. A rotary combustion diesel engine as claimed in claim 1 and in which each rotor working face has a trough-like recess only on and confined substantially to the trailing portion of said working face.

3. A rotary combustion diesel engine as claimed in claim 2 in which said fuel injection means discharges fuel into said trough-like recesses in the rotor working faces.

4. A rotary combustion diesel engine as claimed in claim 2 in which said seal means is ineffective relative to a rotor working face when the leading edge of the trough-like recess of said working face moves past said lobe junction.

5. A rotary combustion diesel engine as claimed in claim 1 and in which said seal means comprises:
   a. a movable seal element carried by the outer body adjacent to said lobe junctions;
   b. means for causing said movable seal element to move into sealing cooperation with a working face of the inner body after the inner body shortly apex portion at the leading end of said working face has rotated past the seal element so as to divide the adjacent working chamber into said leading and trailing portions; and
   c. means for causing said movable seal element to retract from said inner body working face prior to rotation of the inner body apex portion at the trailing end of said working face past said seal element.

6. A rotary combustion diesel engine as claimed in claim 5 and including cam means driven by the engine for moving said seal element.

7. A rotary combustion diesel engine as claimed in claim 5 and including fluid pressure means responsive to the pressure in the working chambers during their compression phase for moving said seal element.

8. A rotary combustion diesel engine as claimed in claim 5 in which each rotor working face has a trough-like recess confined substantially to the trailing portion of said working face and further in which said movable seal element is retracted from said working face approximately when the leading portion of the trough-like recess of said working face has moved past said seal element.

9. A rotary combustion diesel engine as claimed in claim 1 in which said seal means comprises a labyrinth seal structure providing sealing cooperation between the leading portion of each rotor working face and said lobe junction.

10. A rotary combustion diesel engine as claimed in claim 9 in which the trailing portion of each rotor working face has a trough-like recess.

11. A rotary combustion diesel engine as claimed in claim 9 in which said labyrinth seal structure comprises labyrinth-type recesses in the leading portion of each rotor working face.

12. A rotary combustion diesel engine as claimed in claim 9 in which said labyrinth seal structure comprises labyrinth-type recesses in the outer body peripheral surface in the region of said lobe junction.

* * * * *